US007616092B2

(12) United States Patent
Shafer et al.

(10) Patent No.: US 7,616,092 B2
(45) Date of Patent: Nov. 10, 2009

(54) WIRELESS TRANSPONDER FOR A SECURITY SYSTEM

(75) Inventors: Gary Mark Shafer, Boca Raton, FL (US); Stewart E. Hall, Wellington, FL (US); Douglas Allen Drew, Boca Raton, FL (US)

(73) Assignee: Sensormatic Electronics Corporation, Boca Raton, FL (US)

( * ) Notice: Subject to any disclaimer, the term of this patent is extended or adjusted under 35 U.S.C. 154(b) by 108 days.

(21) Appl. No.: 10/843,275

(22) Filed: May 11, 2004

(65) Prior Publication Data

US 2005/0253686 A1 Nov. 17, 2005

(51) Int. Cl.
*H04Q 5/22* (2006.01)

(52) U.S. Cl. ................ 340/10.1; 340/5.61; 340/825.69; 340/825.72; 340/572.1; 340/572.2; 340/572.4

(58) Field of Classification Search ................ 340/10.1, 340/572.1, 10.2, 825.72, 825.69, 10.4, 572.2, 340/573.4, 5.2, 3.1, 3.51, 5.1; 235/462.13, 235/436; 236/385
See application file for complete search history.

(56) References Cited

U.S. PATENT DOCUMENTS

| | | | | |
|---|---|---|---|---|
| 4,611,198 | A | 9/1986 | Levinson et al. | |
| 5,223,816 | A * | 6/1993 | Levinson et al. | 340/539.13 |
| 5,959,568 | A * | 9/1999 | Woolley | 342/42 |
| 6,731,198 | B1 * | 5/2004 | Stobbe et al. | 340/10.33 |
| 7,005,985 | B1 * | 2/2006 | Steeves | 340/572.1 |
| 2005/0083180 | A1 * | 4/2005 | Horwitz et al. | 340/10.4 |
| 2005/0237953 | A1 * | 10/2005 | Carrender et al. | 370/278 |

FOREIGN PATENT DOCUMENTS

| | | |
|---|---|---|
| EP | 0357309 | 3/1990 |

* cited by examiner

*Primary Examiner*—Vernal U Brown
(74) *Attorney, Agent, or Firm*—Kacvinsky LLC

(57) ABSTRACT

Method and apparatus for a wireless transponder for a security system are described.

26 Claims, 6 Drawing Sheets

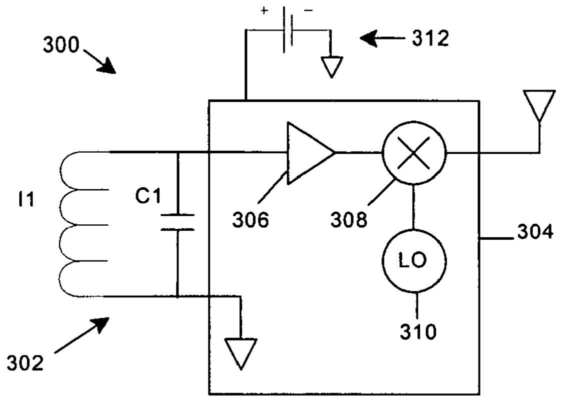
FIG. 3A
FIG. 3B
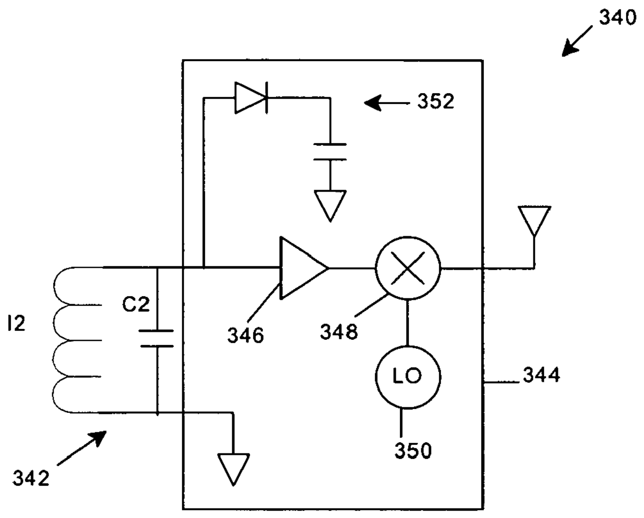

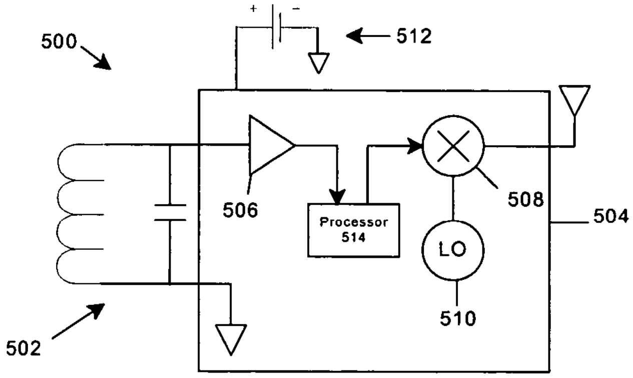
FIG. 5A
FIG. 5B
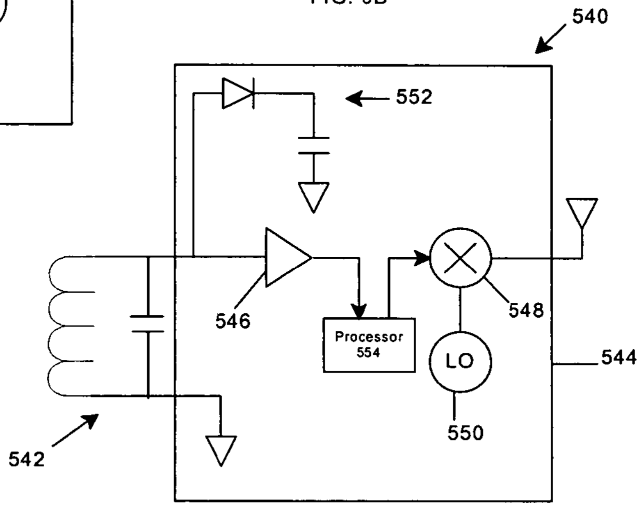

600

WIRELESS TRANSPONDER FOR A SECURITY SYSTEM

BACKGROUND

An Electronic Article Surveillance (EAS) system is designed to prevent unauthorized removal of an item from a controlled area. A typical EAS system may comprise a monitoring system and one or more security tags. The monitoring system may create an interrogation zone at an access point for the controlled area. A security tag may be fastened to an item, such as an article of clothing. If the tagged item enters the interrogation zone, an alarm may be triggered indicating unauthorized removal of the tagged item from the controlled area.

Some EAS systems may have the monitoring system positioned at a different location from the interrogation zone. Consequently, there may be some difficulty in connecting EAS equipment positioned near the interrogation zone to the monitoring system. Accordingly, there may be a need for improvements in EAS systems to solve these and other problems.

BRIEF DESCRIPTION OF THE DRAWINGS

The subject matter regarded as the embodiments is particularly pointed out and distinctly claimed in the concluding portion of the specification. The embodiments, however, both as to organization and method of operation, together with objects, features, and advantages thereof, may best be understood by reference to the following detailed description when read with the accompanying drawings in which:

FIG. 3A illustrates a circuit 300 for transponder 200 in accordance with one embodiment;

FIG. 3B illustrates a circuit 340 for transponder 200 in accordance with one embodiment;

FIG. 5A illustrates a circuit 500 for transponder 400 in accordance with one embodiment;

FIG. 5B illustrates a circuit 540 for transponder 400 in accordance with one embodiment.

DESCRIPTION OF SPECIFIC EMBODIMENTS

Numerous specific details may be set forth herein to provide a thorough understanding of the embodiments. It will be understood by those skilled in the art, however, that the embodiments may be practiced without these specific details. In other instances, well-known methods, procedures, components and circuits have not been described in detail so as not to obscure the embodiments. It can be appreciated that the specific structural and functional details disclosed herein may be representative and do not necessarily limit the scope of the embodiments.

It is worthy to note that any reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Figure 1:
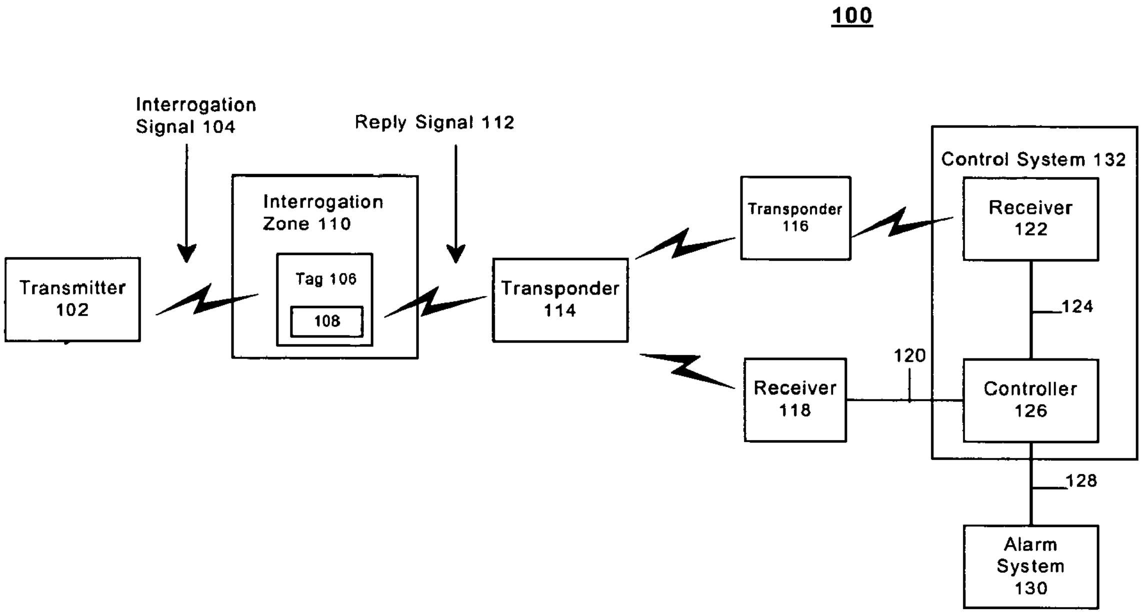
FIG. 1 illustrates a block diagram of a system 100 in accordance with one embodiment.

Referring now in detail to the drawings wherein like parts may be designated by like reference numerals throughout, there is illustrated in FIG. 1 a system suitable for practicing one embodiment. FIG. 1 illustrates an EAS system 100. EAS system 100 may comprise monitoring equipment configured to monitor an interrogation zone, such an interrogation zone 110. The monitoring equipment may be configured to detect the presence of a security tag 106 within interrogation zone 110, and to make a predetermined response upon detection, such as generating an alarm.

EAS system 100 may comprise a number of different elements or components. In one embodiment, EAS system 100 may partially comprise components of an EAS system such as the Ultra•Max® System made by Sensormatic® Corporation, although the embodiments are not limited in this context. The components may be connected by one or more types of wired or wireless communications media. The communications media may comprise any media capable of carrying information signals, such as metal leads, semiconductor material, twisted-pair wire, co-axial cable, fiber optics, electromagnetic spectrum, and so forth. The connection may comprise, for example, a physical connection or logical connection.

In one embodiment, EAS system 100 may include a transmitter 102, a security tag 106, a transponder 114, a transponder 116, a receiver 118, a receiver 122, a controller 126, and an alarm system 128. Although FIG. 1 shows a limited number of elements, it can be appreciated that any number of additional elements may be used in system 100. The embodiments are not limited in this context.

In one embodiment, EAS system 100 may comprise transmitter 102. Transmitter 102 may comprise any transmitter system configured to transmit an electromagnetic signal at a desired operating range. In one embodiment, for example, the operating range for transmitter 102 may comprise a lower frequency range with respect to EAS systems, such as 50 Hertz (Hz) to 13 Megahertz (MHz), or more particularly, 73 Hz, 58 KHz, 8 MHz, and so forth. The embodiments are not limited in this context.

Transmitter 102 may comprise a transmitter antenna operatively coupled to an output stage. The output stage may comprise various conventional driving and amplifying circuits, including a circuit to generate a low frequency electric current. When the low frequency electric current is supplied to the transmitter antenna, the transmitter antenna may generate low frequency electromagnetic signals around the transmitter antenna. The low frequency electromagnetic signals may comprise interrogation signal 104. Transmitter 102 may be configured to generate the electromagnetic field with sufficient strength to cover the same area as interrogation zone 110.

In one embodiment, EAS system 100 may comprise security tag 106. Security tag 106 may be designed to attach to an item to be monitored. Examples of tagged items may include an article of clothing, a Digital Video Disc (DVD) or Compact Disc (CD) jewel case, a movie rental container, packaging material, and so forth. The embodiments are not limited in this context.

In one embodiment, security tag 106 may comprise a tag body encapsulating a marker 108. The security tag body may be soft or hard structure designed to support marker 108. Marker 108 may comprise any marker suitable for use with an EAS system. In one embodiment, for example, marker 108 may comprise a magneto-mechanical EAS marker. Marker 108 may include an active element and a bias element. When the bias element is magnetized in a certain manner, the resulting bias magnetic field applied to the active element causes the active element to be mechanically resonant at a predetermined frequency upon exposure to interrogation signal 104 which alternates at the predetermined frequency. The resonance of marker 108 in response to interrogation signal 104 forms a reply signal 112. Reply signal 112 may be propagated through various components of EAS system 100 to controller 126 for use in detecting the presence of marker 108 within interrogation zone 110.

In one embodiment, EAS system 100 may comprise receiver 118 and receiver 122. Receivers 118 and 122 are similar in that they each may comprise any receiver system configured to receive reply signal 112 from marker 108 via one or more transponders 114 and/or 116. For example, receivers 118 and 122 may comprise conventional amplifying and signal-processing circuits, such as band pass filters, mixers and amplifier circuits. In addition, receivers 118 and 122 may each comprise an output stage connected to controller 126 via lines 120 and 124, respectively.

In one embodiment, receivers 118 and 122 may differ in that each receiver may be tuned to receive reply signal 112 at different operating frequencies. In one embodiment, for example, receiver 122 may be configured to receive reply signal 112 at the lower frequency range as originally transmitted from marker 108. In this case, receiver 122 may comprise part of a conventional EAS control system 132 for EAS system 100, which may comprise receiver 122 connected via a wired connection 124 to controller 126. Receiver 118 may be configured, however, to receive reply signal 112 at a higher frequency range as used by transponder 114, as discussed in more detail below.

In one embodiment, EAS system 100 may comprise controller 126. Controller 126 may comprise a part of control system 132 configured to manage various operations for EAS system 100. Controller 126 may be connected to receiver 118 via line 120, and receiver 122 via line 124. Controller 126 may receive processed signals from receiver 118 and/or receiver 122. Controller 126 may use the processed signals to determine whether security tag 106 is within interrogation zone 110. If security tag 106 is detected within interrogation zone 110, controller 126 may generate a marker detect signal and forward the signal to alarm system 130.

In one embodiment, EAS system 100 may comprise alarm system 130. Alarm system 130 may comprise any type of alarm system to provide an alarm in response to an alarm signal. The alarm signal may be received from any number of EAS components, such as controller 126 via line 128. Alarm system 130 may comprise a user interface to program conditions or rules for triggering an alarm. Examples of the alarm may comprise an audible alarm such as a siren or bell, a visual alarm such as flashing lights, or a silent alarm. A silent alarm may comprise, for example, an inaudible alarm such as a message to a monitoring system for a security company. The message may be sent via a computer network, a telephone network, a paging network, and so forth. The embodiments are not limited in this context.

In general operation, transmitter 102 may communicate signals 104 into interrogation zone 110. When marker 108 enters interrogation zone 110 it may receive interrogation signal 104, and transmit reply signal 112 at the resonant frequency of marker 108. Receiver 118 and/or receiver 122 may receive reply signal 112 via transponders 114 and/or 116, as discussed in more detail below. Receivers 118 and/or 122 may then process the signal into electrical current, and forward the processed signal to controller 126. Controller 126 may receive and analyze the processed signal to determine whether security tag 106 is within interrogation zone 110. If security tag 108 is detected within interrogation zone 110, controller 126 may send a marker detect signal to alarm system 130. Alarm system 130 may then sound an alarm to indicate a possible unauthorized removal of a secured item from the controlled area.

In one embodiment, control system 132 may receive reply signal 112 in a number of different ways. For example, receiver 122 may receive reply signal 112 directly from marker 108. This may occur when control system 132 is located within the transmission range of marker 108. There may be case, however, when control system 132 may be positioned outside the transmission range of marker 108. This may be desirable, for example, if interrogation zone 110 is covering a relatively large exit for a controlled area. In this case, a plurality of receivers (e.g., receiver antennas) may be placed in locations dispersed throughout interrogation zone 110 to provide complete coverage of the exit for the controlled area protected by interrogation zone 110. While these remote receivers may improve overall performance of an EAS system by providing marker detection capabilities in locations physically remote from the EAS control system, they are often difficult and expensive to install due to the need to run wires between control system 132 and the remote receiver antennas. In many cases, customers also object to having trenches cut in flooring at the exits of stores to run cables due to lost sales. Other problems encountered include the need to use expensive cable or conduit to meet building codes, and the need for expensive shielding when these cables are routed adjacent to electrically noisy data, power cables or other noise sources such as florescent lighting ballasts.

EAS system 100 may solve these and other problems through the use of one or more transponders 1-N. More particularly, reply signals 112 may be communicated between marker 108 and controller 126 through the use of one or more transponders, such as transponder 114 and transponder 116. Transponders 114 and 116 may operate similar to a signal repeater in a network, as modified for use with EAS system 100. Although only two transponders are shown in FIG. 1 for purposes of clarity, it may be appreciated that any number of transponders may be implemented for EAS system 100, based upon such factors as the distance between interrogation zone 110 and receiver 122, the size of the exit for the controlled area protected by EAS system 100, number and type of interference or noise sources, and so forth. The embodiments are not limited in this context.

As shown in FIG. 1, reply signals 112 may be communicated between marker 108 and controller 126 using one of two alternate paths. In the first path, reply signals 112 may be transmitted between marker 108 and controller 126 via a single transponder, such as transponder 114, and receiver 118. In the second path, reply signals 112 may be transmitted between marker 108 and controller 126 via multiple transponders, such as transponder 114 and transponder 116, as well as receiver 122. In both paths, the repeating or retransmission operations performed by transponders 114 and 116 may be accomplished using a different frequency than the operating frequency of transmitter 102, marker 108 and receiver 122. For example, transponder 114, transponder 116, and receiver 118 may all be configured to operate at a higher frequency than the other components of EAS system 100. This may reduce the amount of interference experienced by the lower frequency components of EAS system 100, particularly receiver 122. Transponders 114 and 116, and receiver 118, may be discussed in more detail with reference to FIGS. 2-8.

Figure 2:
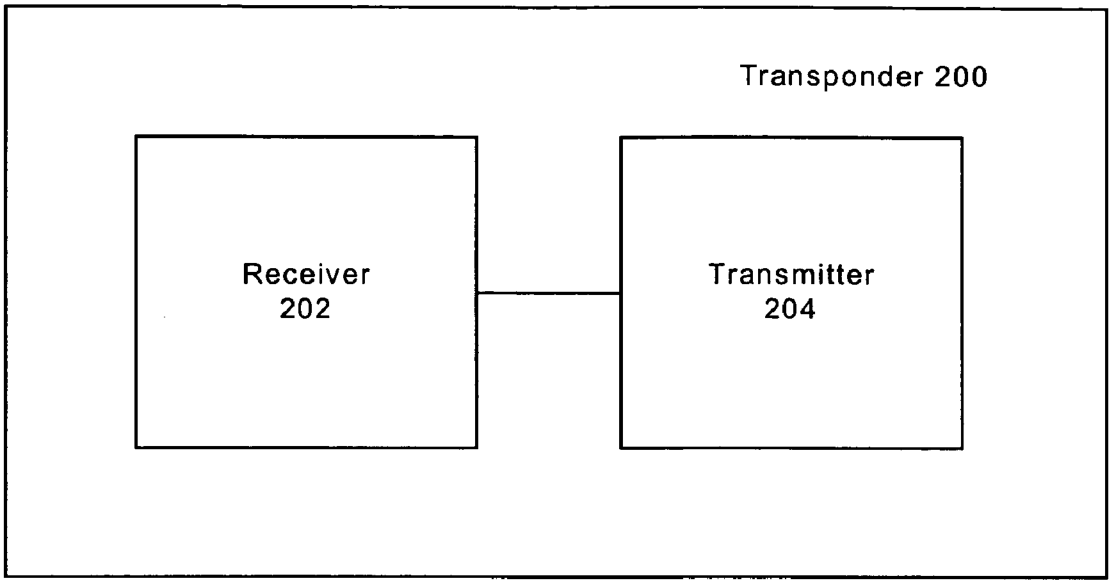
FIG. 2 illustrates a block diagram of a transponder 200 in accordance with one embodiment.

FIG. 2 illustrates a block diagram of a transponder 200 in accordance with one embodiment. Transponder 200 may be configured to operate in several different modes, with each mode corresponding to a different set of operating frequencies implemented for a receiver 202 and a transmitter 204. For example, transponder 200 may have a first mode which allows it to operate as transponder 114, and a second mode which allows it to operate as transponder 116. Selection of the first mode or second mode allows a single type of transponder to be configured for a particular set of operations when implemented for a particular controlled area. Alternatively, the functionality associated with the first mode may be implemented in a first type of transponder, and the functionality associated with the second mode may be implemented in a second type of transponder. As used herein, reference to the first mode or second mode is intended to describe the functionality associated with a corresponding physical transponder device. For example, a transponder 200 configured to operate in the first mode may represent transponder 114, and a transponder 200 configured to operate in the second mode may represent transponder 116, thereby allowing transponder 200 to represent two physical devices for use with EAS system 100.

As shown in FIG. 2, transponder 200 may comprise a receiver 202 and a transmitter 204. The operating frequencies of receiver 202 and transmitter 204 may change depending upon whether transponder 200 is implemented as transponder 114 or transponder 116. Although FIG. 2 shows a limited number of elements, it can be appreciated that any number of elements may be used in transponder 200.

In one embodiment, transponder 200 may be implemented in a first mode to operate as transponder 114. When implemented in the first mode, receiver 202 may be configured to receive reply signal 112 at a first frequency from marker 108 within interrogation zone 110 for EAS system 100. In one embodiment, the first frequency may comprise a lower frequency, such as 50 Hz to 13 MHz, or more particularly, 73 Hz, 58 KHz or 8 MHz. For a given implementation, the first frequency may correspond to the operating frequency of marker 108 and reply signal 112.

In one embodiment, transponder 200 may comprise transmitter 204 connected to receiver 202. When transponder 200 is implemented in the first mode as transponder 114, transmitter 204 may be configured to transmit reply signal 112 received by receiver 202 at a second frequency. In one embodiment, the second frequency may comprise a higher frequency than the first frequency. For example, the second frequency may comprise a frequency ranging between 13.01 MHz to 2.45 Gigahertz (GHz), or more particularly, a 13.56 MHz, 27 MHz, 868 MHz, 915 MHz, 2.45 GHz, and so forth. The embodiments are not limited in this context.

In general operations for the first mode, transponder 200 may receive reply signal 112 from marker 108 using receiver 202. Receiver 202 may pass the receiver reply signal 112 to transmitter 204. Transmitter 204 may convert reply signal 112 from the first frequency to the second frequency. Transmitter 204 may communicate reply signal 112 at the second frequency to receiver 118. Receiver 118 may be configured to receive reply signal 112 at the second frequency, convert reply signal 112 to the first frequency, and send reply signal 112 to control system 132, such as controller 126 via line 120.

In one embodiment, transponder 200 may be implemented in the second mode to operate as transponder 116. When transponder 200 is implemented in the second mode as transponder 116, receiver 202 may be configured to receive reply signal 112 at the second frequency from transponder 114. Receiver 202 may pass reply signal 112 to transmitter 204. Transmitter 204 may transmit reply signal 112 to receiver 122 at the first frequency. Receiver 122 may be configured to receive reply signal 112 at the first frequency, and send reply signal 112 to controller 126 via line 124.

As shown above, a pair of transponders 200 may be implemented for a given interrogation zone 110. Use of transponders 200 increase the distance by which reply signal 112 may be communicated to controller 126. By converting reply signal 112 between low frequency and high frequency signals, several advantages may be achieved. For example, multiple transponders may be used to repeat reply signal 112 at a higher frequency without causing additional interference with the low frequency components of the system. In another example, the higher frequencies offer potentially higher amounts of available bandwidth, allowing the transponders to communicate more information signals other than just reply signal 112, as discussed in more detail below. In yet another example, the transponders may be seamlessly interfaced with existing low frequency EAS systems.

In addition to the first mode and second mode, transponder 200 may also be implemented in a third mode. In the third mode, receiver 202 may be configured to receive reply signal 112 at the second frequency, and transmitter 204 may be configured to transmit reply signal 112 at the same second frequency. In the third mode, transponder 200 may be used to implement a plurality of transponders for a given interrogation zone 110. Each transponder would repeat reply signal 112 at the second frequency from another transponder until the signal reached a transponder operating in the second mode, at which point reply signal 112 would be converted to the first frequency and transmitted to receiver 122.

In one embodiment, transponder 200 may be implemented in a fourth mode. In the fourth mode, receiver 202 may be configured to receive reply signal 112 at the first frequency, and transmitter 204 may be configured to transmit reply signal at the first frequency. In the fourth mode, transponder 200 may be used to implement a plurality of transponders for a given interrogation zone 110. Each transponder would repeat reply signal 112 at the first frequency from another transponder until the signal reached receiver 122. The fourth mode may result in a less complex transponder thereby decreasing associated costs, but may increase interference with the low frequency components of EAS system 100. Further, the fourth mode may be used for a transponder implemented with a high frequency system, such as an EAS system operating in the microwave range (e.g., 950 MHz or 2.45 GHz).

FIG. 3A illustrates a circuit 300 for transponder 200 in accordance with one embodiment. Circuit 300 may comprise an example implementation representative of transponder 200. As shown in FIG. 3, circuit 300 may comprise a receiver antenna 302. Receiver antenna 302 may comprise an inductor 11 arranged in parallel with a capacitor C1. Receiver antenna 302 may receive reply signal 112, and pass reply signal 112 to transmitter 304. Transmitter 304 may comprise an amplifier 306 to receive as input reply signal 112 and output an amplified signal to mixer 308. Transmitter may also comprise a local oscillator to provide an oscillation signal to mixer 308. Mixer 308 receives as input the amplified signal and the oscillation signal, and outputs reply signal 112 at the second frequency. Circuit 300 may also comprise a power source, with the power source to comprise a battery powered circuit 312.

FIG. 3B illustrates a circuit 340 for transponder 200 in accordance with one embodiment. Circuit 340 may comprise another example implementation representative of transponder 200. Elements 342, 344, 346, 348 and 350 of circuit 340 may be similar to corresponding elements 302, 304, 306, 308 and 310 of circuit 300. Circuit 340 may also comprise a power source, with power source to comprise a power circuit 352 configured to convert signals from a radio-frequency field to direct current (DC) power. In one embodiment, circuit 340 may be powered by the ambient transmitted field of EAS system 100, thereby obviating the need for conventional power sources such as a battery as used in circuit 300, which may need periodic replacement, or alternating current (AC) power from the main power supply of the controlled area, which may need a power outlet near the transponder.

Figure 4:
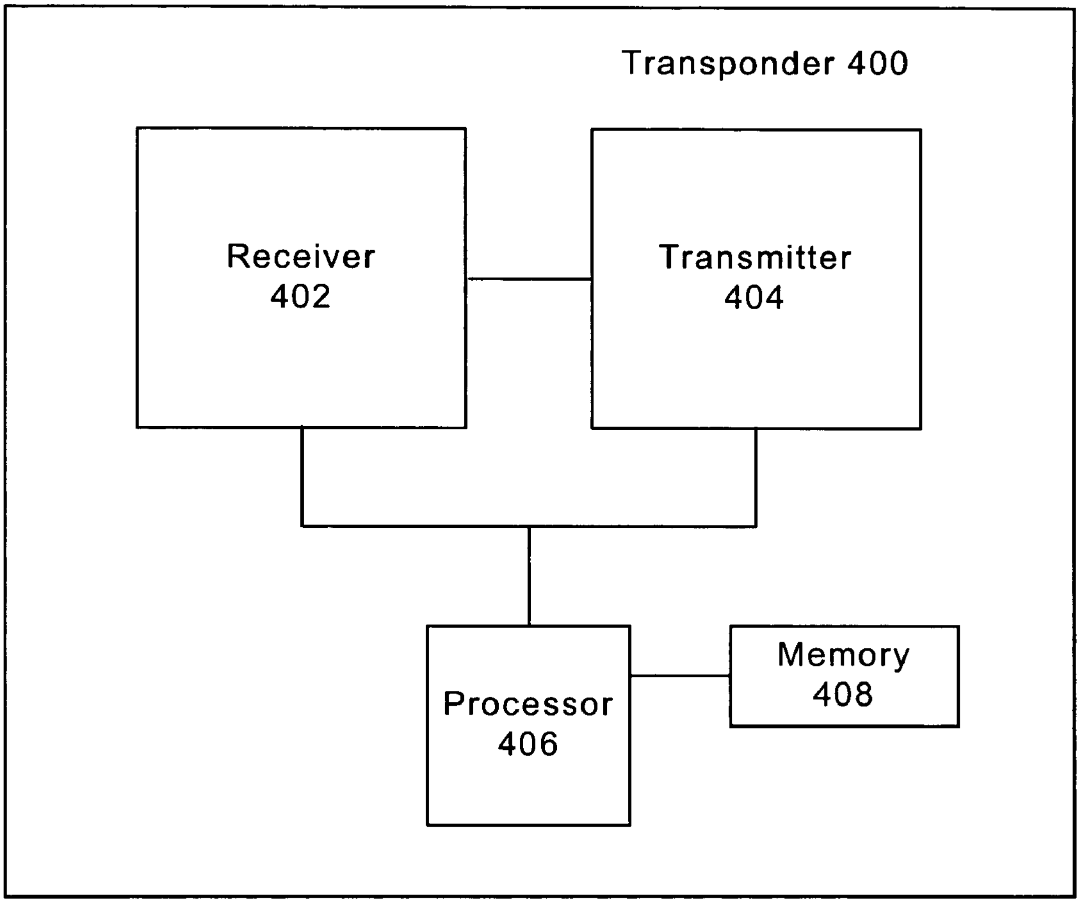
FIG. 4 illustrates a transponder 400 in accordance with one embodiment.

FIG. 4 illustrates a transponder 400 in accordance with one embodiment. Transponder 400 may be representative of transponders 114, 116, and/or 200. Transponder 400 may comprise a receiver 402 and a transmitter 404. Receiver 402 and transmitter 404 of transponder 400 may be similar to receiver 202 and transmitter 204, respectively, of transponder 200. In addition, transponder 400 may further include a processor 406 and memory 408, connected to receiver 402 and transmitter 404. Although FIG. 4 shows a limited number of elements, it can be appreciated that any number of elements may be used in transponder 400.

In one embodiment, transponder 400 may comprise processor 406. Processor 406 can be any type of processor capable of providing the speed and functionality appropriate for the embodiments. For example, processor 406 could be a general-purpose processor made by Intel® Corporation and others. Processor 406 may also comprise a digital signal processor (DSP) and accompanying architecture. Processor 406 may further comprise a dedicated processor such as a network processor, embedded processor, micro-controller, controller, analog processor, and so forth. The embodiments are not limited in this context.

In one embodiment, transponder 400 may comprise memory 408. Memory 408 may comprise a machine-readable medium and may include any medium capable of storing instructions and/or data adapted to be executed by a processor. Some examples of such media include, but are not limited to, read-only memory (ROM), random-access memory (RAM), programmable ROM, erasable programmable ROM, electronically erasable programmable ROM, dynamic RAM, magnetic disk (e.g., floppy disk and hard drive), optical disk (e.g., CD-ROM), and so forth.

In general operation, transponder 400 may be one type of transponder used to communicate reply signal 112 between various transponders located in or near interrogation zone 110 to increase the distance between interrogation zone 110 and control system 132. In addition, receiver 402 may receive reply signal 112, and pass reply signal 112 to processor 406. Processor 406 may qualify reply signal 112, and output a data signal representative of reply signal 112. Transmitter 404 may transmit the data signal to another transponder, and/or receiver 118 or receiver 122.

The qualification operation may provide several advantages. For example, processor 406 may be used to ensure that reply signal 112 is actually a reply signal from marker 108, versus false noise signatures from other objects within interrogation zone 110, such as radios, magnets, electronic devices, power sources, and so forth. If reply signal 112 is qualified as originating from marker 108, transmitter 404 may transmit the data signal to receiver 118 or receiver 122. If reply signal 112 is determined to be a false signal, transponder 400 may be configured to perform any number of operations, such as dropping the false signal to reduce bandwidth demands, maintain a log of false signals, and so forth. The embodiments are not limited in this context.

In another example, transponder 400 may be configured to perform operations similar to those found in a Radio Frequency Identification (RFID) system. A RFID system is designed to operate with security tags using an RFID chip in addition to, or instead of, marker 108. The RFID chip may transmit information in addition to a signal indicating the presence of security tag 106 within interrogation zone 110, such as a unique identifier for security tag 106. This may be particularly advantageous for use with inventory systems, for example. Similarly, transponder 400 may transmit information about marker 108 in addition to reply signal 112. For example, transponder 400 may be positioned within a certain location within interrogation zone 110, such as particular aisle in a grocery store. Consequently, transponder 400 may repeat reply signal 112, and may also append information regarding the particular location or area where reply signal 112 was received, a unique identifier for transponder 400, a date and time when reply signal 112 was received, and so forth. The embodiments are not limited in this context.

In yet another example, transponder 400 may also be used to create a data network as part of EAS system 100. Multiple transponders 400 may be implemented throughout interrogation zone 110, and data may be communicated between the transponders for various applications. For example, controller 126 may communicate configuration information to one or more transponders 400 for various parts of EAS system 100, including the transponders themselves. In another example, EAS system 100 may be remotely managed via transponder 400, allowing such operations as remote monitoring, remote configuration, remote troubleshooting, and so forth. In yet another example, transponder 400 may offer access to other data networks accessible by EAS system 100, such as the Internet or World Wide Web (WWW). The embodiments are not limited in this context.

In accordance with the above examples, receiver 118 or receiver 122 may further comprise components needed to receive and interpret the digital data signal, and may send the data signal to controller 126. Controller 126 may also be modified to perform detection in accordance with the data signal.

FIG. 5A illustrates a circuit 500 for transponder 400 in accordance with one embodiment. Circuit 500 may comprise an example implementation representative of transponder 400. Elements 502, 504, 506, 508, 510 and 512 of circuit 500 may be similar to corresponding elements 302, 304, 306, 308, 310 and 312 of circuit 300. In addition, circuit 500 may comprise a processor 514 to implement the operations discussed with reference to transponder 400 of FIG. 4.

FIG. 5B illustrates a circuit 540 for transponder 400 in accordance with one embodiment. Elements 542, 544, 546, 548, 550 and 552 of circuit 540 may be similar to corresponding elements 342, 344, 346, 348, 350 and 352 of circuit 340. In addition, circuit 540 may comprise a processor 554 to implement the operations discussed with reference to transponders 400 of FIG. 4.

Figure 6:
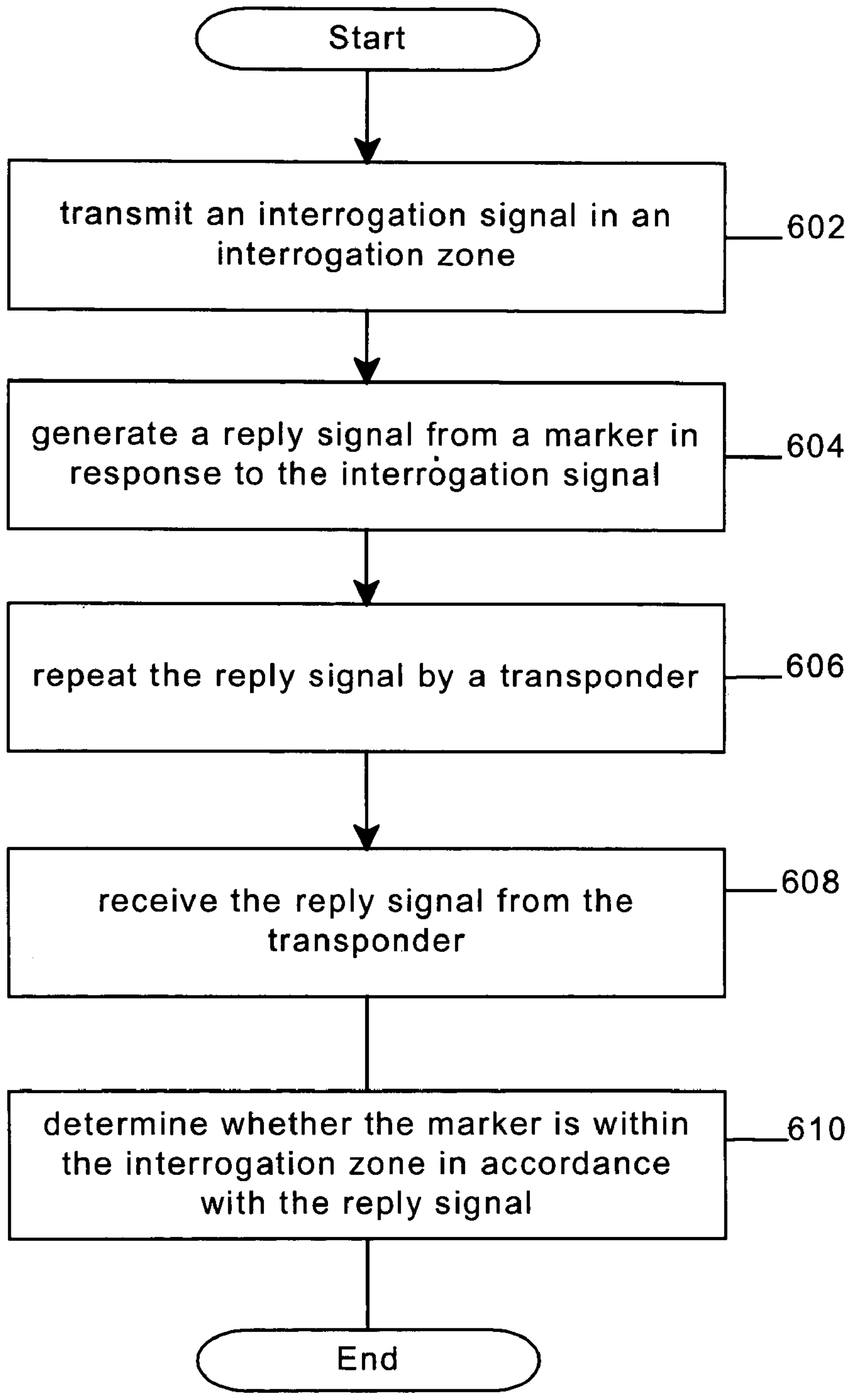
FIG. 6 illustrates a block flow diagram 600 in accordance with one embodiment.

FIG. 6 illustrates a block flow diagram 600 in accordance with one embodiment. Diagram 600 may illustrate a set of operations that may be representative of the operations executed by one or more components of EAS system 100 as described herein, such as transponders 200, 300, 400, and 500, as well as others. As shown in diagram 600, an interrogation signal may be transmitted in an interrogation zone at block 602. A reply signal may be generated from a marker in response to the interrogation signal at block 604. The reply signal may be repeated by a transponder at block 606. The reply signal may be received from the transponder at block 608. A determination whether the marker is within the interrogation zone in accordance with the reply signal at block 610.

In one embodiment, the reply signal may be repeated by the transponder at block 606 by receiving the reply signal at a first frequency. The reply signal may be converted to a second frequency. The reply signal may be transmitted at the second frequency.

In one embodiment, the reply signal may be received from the transponder at block 608 by receiving the reply signal at the second frequency. The reply signal may be converted to the first frequency. The reply signal may be sent to a controller.

In one embodiment, the reply signal may be received from the transponder at block 608 by receiving the reply signal at the second frequency by a second transponder. The reply signal may be converted to the first frequency. The reply signal may be transmitted at the first frequency. The reply signal may be receive at the first frequency, and sent to controller.

As discussed previously, EAS system 100 may be implemented using a plurality of transponders. In this case, each transponder may represent a communication node. A communication node may comprise any physical or logical entity having a unique address in system 100. The unique address may comprise, for example, a network address such as an Internet Protocol (IP) address, device address such as a Media Access Control (MAC) address, and so forth. The embodiments are not limited in this context.

The nodes may be connected by one or more types of communications media. The communications media may comprise any media capable of carrying information signals, such as metal leads, semiconductor material, twisted-pair wire, co-axial cable, fiber optics, RF spectrum, and so forth. The connection may comprise, for example, a physical connection or logical connection.

The nodes may be connected to the communications media by one or more input/output (I/O) adapters. The I/O adapters may be configured to operate with any suitable technique for controlling communication signals between computer or network devices using a desired set of communications protocols, services and operating procedures. The I/O adapter may also include the appropriate physical connectors to connect the I/O adapter with a given communications medium. Examples of suitable I/O adapters may include a network interface card (NIC), radio/air interface, and so forth.

The nodes of system 100 may be configured to communicate different types of information, such as media information and control information. Media information may refer to any data representing content meant for a user, such as voice information, video information, audio information, text information, alphanumeric symbols, graphics, images, and so forth. Control information may refer to any data representing commands, instructions or control words meant for an automated system. For example, control information may be used to route media information through a system, or instruct a node to process the media information in a predetermined manner.

The nodes may communicate the media and control information in accordance with one or more protocols. A protocol may comprise a set of predefined rules or instructions to control how the nodes communicate information between each other. The protocol may be defined by one or more protocol standards, such as the standards promulgated by the Internet Engineering Task Force (IETF), International Telecommunications Union (ITU), and so forth. For example, each transponder may communicate data between each other in accordance with the 802.11 family of protocols.

It is worthy to note that the terms "first", "second", "third" and "fourth" as used herein are logical descriptors used to denote different physical elements, components or devices, for purposes of clarity of description. A given logical descriptor, however, is not necessarily limited to the same physical element, component or device, in which the logical descriptor originally references. For example, the terms "first receiver" and "second receiver" are intended herein to mean two different receivers, and not necessarily the receivers originally described as the "first receiver" and "second receiver."

All or portions of an embodiment may be implemented using an architecture that may vary in accordance with any number of factors, such as desired computational rate, power levels, heat tolerances, processing cycle budget, input data rates, output data rates, memory resources, data bus speeds and other performance constraints. For example, an embodiment may be implemented using software executed by a processor. In another example, an embodiment may be implemented as dedicated hardware, such as a circuit, an application specific integrated circuit (ASIC), Programmable Logic Device (PLD) or digital signal processor (DSP), and so forth. In yet another example, an embodiment may be implemented by any combination of programmed general-purpose computer components and custom hardware components. The embodiments are not limited in this context.

The invention claimed is:

1. An apparatus, comprising:

a first receiver configured to receive a reply signal at a first frequency from a marker positioned remotely from said receiver, and within an interrogation zone for an electronic article surveillance system, and said first receiver to convert said reply signal to a second frequency;

a first transmitter to connect to said receiver, said first transmitter to transmit said reply signal at said second frequency; and a second receiver configured to receive said reply signal at said second frequency, said second receiver to convert said reply signal from said second frequency to said first frequency, and send said reply signal to a controller.

2. The apparatus of claim 1, wherein said first frequency comprises a lower frequency in a range between 50 Hertz to 13 Megahertz, and said second frequency comprises a higher frequency in a range between 13.01 Megahertz to 2.45 Gigahertz.

3. The apparatus of claim 1, wherein said first frequency comprises a higher frequency in a range between 13.01 Megahertz to 2.45 Gigahertz, and said second frequency comprises a lower frequency in a range between 50 Hertz to 13 Megahertz.

4. The apparatus of claim 1, wherein said first frequency corresponds to said second frequency.

5. The apparatus of claim 1, wherein said first receiver comprises an inductor-capacitor antenna.

6. The apparatus of claim 1, wherein said first transmitter comprises: an amplifier to receive as input said reply signal and output an amplified signal; a local oscillator to provide an oscillation signal; and a mixer to connect to said amplifier and local oscillator, said mixer to receive as input said amplified signal and said oscillation signal and output said reply signal at said second frequency.

7. The apparatus of claim 1, further comprising a power source to provide power to said first receiver and said first transmitter, said power source to comprise a battery powered circuit.

8. The apparatus of claim 1, further comprising a power source to provide power to said first receiver and said first transmitter, said power source to comprise a power circuit configured to convert signals from a radio-frequency field to direct current.

9. The apparatus of claim 1, further comprising: a processor to connect to said first receiver and said first transmitter, said processor to receive said reply signal, qualify said reply signal, and output a data signal representative of said reply signal; and wherein said first transmitter transmits said data signal at said second frequency.

10. The apparatus of claim 9, wherein said processor comprises one of a digital processor or analog processor, and said data signal comprises a digital data signal or analog data signal, respectively.

11. A system, comprising:

a first transmitter to transmit an interrogation signal within an interrogation zone;

a marker to generate a reply signal in response to said interrogation signal;

a first transponder positioned remotely from said marker which is configured to receive said reply signal at a first frequency, convert said reply signal at said first frequency to said replay signal as a second frequency, and transmit said reply signal at a said second frequency;

a first receiver positioned remotely from said marker which is configured to receive said reply signal at said second frequency, and convert said reply signal to said first frequency; and a controller to detect said marker within said interrogation zone using said reply signal at said first frequency, and output a marker detect signal in accordance with said detection.

12. The system of claim 11, wherein said first transponder comprises: a second receiver to receive said reply signal from said marker at said first frequency; and a second transmitter to connect to said second receiver, said second transmitter to transmit said reply signal at said second frequency.

13. The system of claim 12, wherein said first frequency comprises a lower frequency in a range between 50 Hertz to 13 Megahertz, and said second frequency comprises a higher frequency in a range between 13.01 Megahertz to 2.45 Gigahertz.

14. The system of claim 12, wherein said first frequency comprises a higher frequency in a range between 13.01 Megahertz to 2.45 Gigahertz, and said second frequency comprises a lower frequency in a range between 50 Hertz to 13 Megahertz.

15. The system of claim 12, wherein said first frequency corresponds to said second frequency.

16. The system of claim 12, wherein said second receiver comprises an inductor-capacitor antenna.

17. The system of claim 12, wherein said second transmitter comprises: an amplifier to receive as input said reply signal and output an amplified signal; a local oscillator to provide an oscillation signal; and a mixer to connect to said amplifier and local oscillator, said mixer to receive as input said amplified signal and said oscillation signal and output said reply signal at said second frequency.

18. The system of claim 12, further comprising a power source to provide power to said second receiver and said second transmitter, said power source to comprise a battery powered circuit.

19. The system of claim 12, further comprising a power source to provide power to said second receiver and said second transmitter, said power source to comprise a power circuit configured to convert signals from a radio-frequency field to direct current.

20. The system of claim 12, further comprising a processor to receive as input said reply signals, qualify said reply signals, and output a data signal representative of said reply signals.

21. The system of claim 12, wherein said processor comprises one of a digital processor or analog processor, and said data signal comprises a digital data signal or analog data signal, respectively.

22. The system of claim 12, further comprising a second transponder comprising: a third receiver to receive said reply signal from said second transmitter at said second frequency; and a third transmitter to connect to said third receiver, said third transmitter to transmit said reply signal at said first frequency.

23. The system of claim 22, wherein said second transponder further comprises a processor to receive as input said reply signal, qualify said reply signal, and output a data signal representative of said reply signals.

24. A method, comprising:

transmitting an interrogation signal in an interrogation zone;

generating a reply signal from a marker in response to said interrogation signal;

repeating said reply signal by a transponder positioned remotely from said marker by a receiver configured to receive said reply signal at a first frequency;

convening said reply signal to a second frequency; and transmitting said reply signal at said second frequency;

receiving said reply signal from said transponder by a receiver configured to receive said reply signal at said second frequency;

convening said reply signal to said first frequency;

sending said reply signal to a controller; and determining whether said marker is within said interrogation zone in accordance with said reply signal.

25. The method of claim 24, further comprising: receiving said reply signal at said second frequency by a second transponder; convening said reply signal to said first frequency; and transmitting said reply signal at said first frequency.

26. The method of claim 25, wherein receiving said reply signal from said transponder comprises: receiving said reply signal at said first frequency; and sending said reply signal to a controller.

* * * * *